United States Patent [19]
Watanabe

[11] Patent Number: 5,959,959
[45] Date of Patent: Sep. 28, 1999

[54] AUTOMATIC DISK CHANGER WITH DETACHABLE CLAMPERS HELD BY A DISK MOUNTING MECHANISM

[75] Inventor: Kazuyuki Watanabe, Fukushima, Japan

[73] Assignee: Nippon Columbia Co., Ltd.

[21] Appl. No.: 08/567,768

[22] Filed: Dec. 5, 1995

[30] Foreign Application Priority Data

| Dec. 9, 1994 | [JP] | Japan | HO6-331522 |
| Dec. 14, 1994 | [JP] | Japan | HO6-333095 |
| Dec. 14, 1994 | [JP] | Japan | HO6-333096 |

[51] Int. Cl.[6] .......................... G11B 23/00; G11B 17/22
[52] U.S. Cl. ............................... 369/270; 369/36
[58] Field of Search .................. 369/192, 270, 369/271, 36; 360/98.04, 98.06

[56] References Cited

U.S. PATENT DOCUMENTS

| 5,025,340 | 6/1991 | Peters | 369/270 |
| 5,056,082 | 10/1991 | Ekhoff | 369/270 |
| 5,473,585 | 12/1995 | Kim | 369/197 |
| 5,748,606 | 5/1998 | Nakagawa et al. | 369/271 |

FOREIGN PATENT DOCUMENTS

| 58-203669 | 11/1983 | Japan . |
| 60-138767 | 7/1985 | Japan . |
| 64-50269 | 2/1989 | Japan . |
| 2-144160 | 12/1990 | Japan . |
| 3-91159 | 4/1991 | Japan . |
| 4-341968 | 11/1992 | Japan . |
| 5-89586 | 4/1993 | Japan . |

*Primary Examiner*—William J. Klimowicz
*Assistant Examiner*—Kenneth W. Fields
*Attorney, Agent, or Firm*—Dickstein Shapiro Morin & Oshinsky LLP

[57] ABSTRACT

A plurality of disk drive mechanisms are installed in a stationary state being arranged along the retrieving side of a disk rack, a disk mounting mechanism is transferred above the disk drive mechanisms by a transfer mechanism to obtain an objective disk from the disk rack and to set the disk to an objective disk drive mechanism. The disk mounting mechanism holds a plurality of clampers to supply or remove the clamper to or from a turntable.

17 Claims, 7 Drawing Sheets

AUTOMATIC DISK CHANGER WITH DETACHABLE CLAMPERS HELD BY A DISK MOUNTING MECHANISM

BACKGROUND OF THE INVENTION

1. Field of the Invention

The present invention relates to an auto-changer for a disk reproducing apparatus.

2. Description of Related Art

A common disk reproducing apparatus having an auto-changer comprises a disk drive mechanism for reproducing information recorded on a disk, a disk rack for retrievably arranging and storing a plurality of disks, a disk mounting mechanism for mounting a disk extracted from the disk rack on the turntable and dismounting a disk having been reproduced from the turntable to return it to the disk rack, and a transfer mechanism for transferring the disk mounting mechanism to a disk retrieving operation position for the disk rack and to a disk mounting operation position for the turntable.

Further, in a disk reproducing apparatus having an auto-changer with a large scale disk rack capable of storing many disks and a plurality of disk drive mechanisms, the disk rack and the disk drive mechanisms are installed in separate regions. Therefore, the disk mounting mechanism travels a long distance to transfer a disk to be reproduced from the disk rack to a disk drive mechanism, and to dismount a disk from the disk drive mechanism and store it to the disk rack. This leads to the problems because of the large apparatus long transfer times. Furthermore, when the disk rack and the disk drive mechanisms are installed in separate regions, there is a disadvantage in that the outer size of the disk reproducing apparatus becomes large.

A disk reproducing apparatus disclosed in Japanese Patent Application Laid-Open No. 5-89586 (1993) is constructed such that each of the plural disk drive mechanisms is moved to each of disk retrieving positions of the disk rack to extract an objective disk from the disk rack and set it. Then the disk drive mechanism is moved to a dedicated position for performing the disk reproducing process. However, since the disk reproducing apparatus needs to separately prepare a region for transferring each of the disk drive mechanisms to retrieve an objective disk from the disk rack and a region of dedicated position for positioning the disk drive mechanism to reproduce the extracted disk, there is a problem in that the whole apparatus becomes large in size. In addition to this, when it is necessary to provide plural transfer mechanisms for transferring disk drive mechanisms individually, the apparatus becomes mechanically complex.

SUMMARY OF THE INVENTION

An object of the present invention is to provide a small-sized disk reproducing apparatus having an auto-changer.

Another object of the present invention is to provide a disk reproducing apparatus having an auto-changer capable of performing mounting and dismounting of a disk on and off a turntable of the disk drive mechanism in a short time.

A further object of the present invention is to provide a disk mounting mechanism capable of mounting and dismounting a disk on and off a turntable.

In the present invention, a plurality of disk drive mechanisms are installed in a stationary state and arranged along the retrieving side of a disk rack, a disk mounting mechanism is transferred above the disk drive mechanisms by a transfer mechanism to obtain an objective disk from the disk rack and to mount the disk on an objective disk drive mechanism. In a preferred embodiment of the present invention, a plurality of disks are arranged upright and retrievably stored, the disk drive mechanisms include turntables that mount disks horizontally, the disk mounting mechanism is installed in the transfer mechanism so as to rise and flatten, a disk extracted from said disk rack is held in a vertical, rising state, a disk is mounted and dismounted on and off the turntable in a horizontal, flattening state, supplying and removing a clamper on and off the turntable. The clamper clamps a disk by being magnetically attracted to said turntable. When the clamper is recovered from the turntable, the disk mounting mechanism tilts the clamper to detach it from the turntable by pulling up one end of the peripheral portion of the clamper and then pulling up the other end.

DETAILED DESCRIPTION OF THE PREFERRED EMBODIMENTS

Embodiments of the present invention will be described below, referring to the accompanying drawings.

Figure 1:
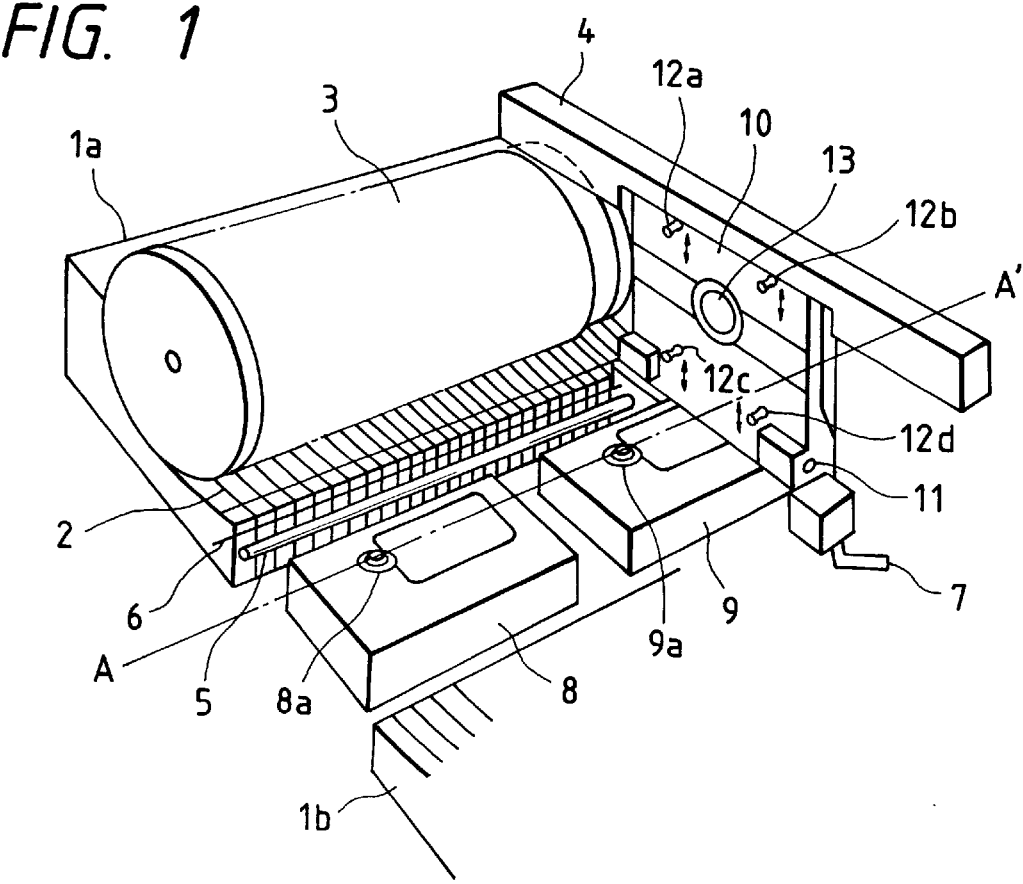
FIG. 1 is a perspective view showing the main part of an embodiment of a disk reproducing apparatus in accordance with the present invention.

FIG. 1 is a perspective view showing the main part of an embodiment of a disk reproducing apparatus in accordance with the present invention. In FIG. 1, disk racks 1a, 1b are arranged in two parallel rows. Each of the disk racks has a plurality of partition plates 2 respectively. Letting n-th partition plate be 2(n), a disk storing groove portion to store n-th disk 3(n) in upright position is formed between the partition plate 2(n) and the partition plate 2(n+1) in the neighbor. A transfer mechanism 4 is installed so as to slide on rails 5 placed along the disk racks 1a, 1b, and is moved along the disk retrieving operating portion of the disk racks 1a, 1b by a driving wire 6 driven by a motor (not shown). The transfer mechanism 4 comprises a disk extracting lever 7 for pushing and extracting an objective disk 3 from the disk rack 1b (1a), and a disk transferring means (not shown) for transferring the extracted disk 3 to a disk holding space of a disk mounting mechanism 10 and returning a disk 3 in the disk holding space to the disk rack 1b (1a).

A first and a second disk drive mechanisms 8, 9 each having turntables 8a, 9a and information reading optical pickups (not shown) are installed between the two disk racks 1a, 1b.

The disk mounting mechanism 10 is installed in the transfer mechanism 4 so as to rotate around an axis 11 to rise, to a vertical position B and flatten to a horizontal position A. The disk mounting mechanism 10 is transferred along the disk retrieving operation portion of the disk racks 1a, 1b above the disk drive mechanisms 8, 9 in the vertical position. The transfer mechanism 4 is stopped when the disk mounting mechanism 10 arrives at a disk extracting operating position facing the disk storing groove portion for storing an objective disk 3 of the disk racks 1a, 1b. Then, the disk mounting mechanism 10 engages a disk 3 by holding the outer periphery of the disk 3 between holding rollers 12a to 12d, after disk 3 has been extracted from the disk rack 1b (1a) by the disk extracting lever 7 and transferred to the disk holding space in front of the disk mounting mechanism 10 by the disk transferring means. The transfer mechanism 4 transfers the disk mounting mechanism 10 holding the disk 3 to the disk mounting operating position for a proper turntable 8a, 9a of the disk drive mechanism 8, 9. When a disk mounting mechanism 10 arrives at the disk mounting operating position, the transfer mechanism 4 is stopped. At this position, the disk mounting mechanism is rotated so as to flatten to mount the disk 3 on the proper turntable 8a, 9a of the disk drive mechanism 8, 9. Then, a clamper 13 is supplied for holding the disk 3 to the turntable 8a, 9a. After supplying the disk 3 and the clamper 13 to the proper turntable 8a (9a), the disk mounting mechanism 10 is rotated so as to rise to prepare for the next disk mounting operation.

When a disk 3 mounted on a turntable 8a, 9a, is to be recovered, the transfer mechanism 4 moves the disk mounting mechanism 10 to a disk mounting operating position to the turntable 8a (9a) of the disk drive mechanism 8 (9) mounting the disk 3. At the disk mounting operating position, the disk mounting mechanism 10 is rotated so as to flatten to hold the disk 3 and the clamper 13 mounted on the turntable 8a (9a) from outside, and is rotated so as to rise to detach the disk 3 and the clamper 13 from the turntable 8a (9a).

The disk mounting mechanism 10 holding the recovered disk 3 and clamper 13 is transferred to the disk retrieving operating position facing to a disk storing groove portion for storing the disk 3 held by the transfer mechanism 4, and then the disk 3 is returned to the disk storing groove portion of the disk rack 1a (1b).

Figure 2:
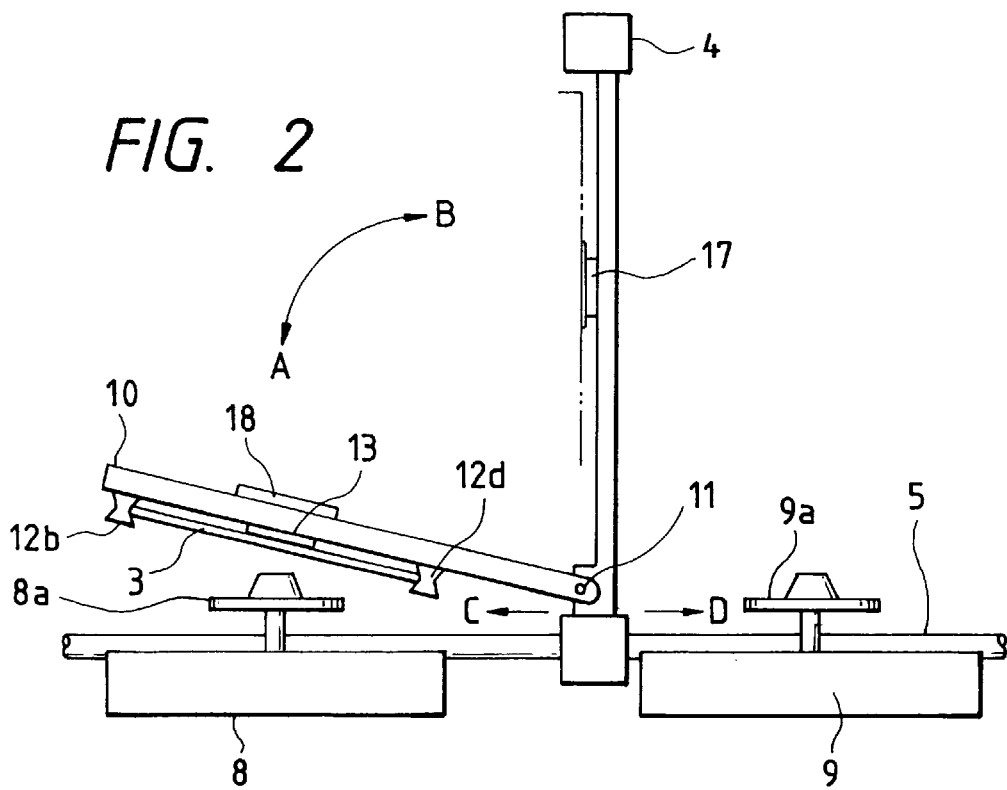
FIG. 2 is a side view along prospective AA' in FIG. 1 explaining the operation of disk mounting and dismounting in a disk reproducing apparatus in accordance with the present invention.

FIG. 2 shows the transfer mechanism 4 for mounting and dismounting a disk 3 to and from the disk drive mechanism 8 as described above and the disk drive mechanisms 8, 9 and the main construction and the operation of the disk mounting mechanism 10. The transfer mechanism 4 moves along the rail 5 in a direction C or D to transfer the disk mounting mechanism 10 to a given disk extracting operating position for one of the disk racks 1a, 1b. The holding rollers 12a to 12d provided in the disk mounting mechanism 10 are of a concave column shape formed by jointing small diameter portions of truncated cones to each other using a cylinder. The holding rollers 12a to 12d receives a disk 3 in a state that the holding rollers are moved outside so that the distance between the holding rollers becomes a little larger than the diameter of the disk 3 to be retrieved from the disk rack 1a(1b) and transferred to the disk holding space by the disk transfer means. After receiving the disk 3, the holding rollers 12a to 12d are moved toward the center of the disk holding space to elastically touch the outer periphery of the disk 3 and hold the disk 3. Although the details will be described later, the holding rollers 12a to 12d are swingably attached to the top end portions of roller arms provided in the disk mounting mechanism 10. The roller arms are applied with force by springs so that the holding rollers 12a to 12d may move toward the center of the disk holding space, and the movement of the holding rollers outward for receiving the disk 3 is performed using cams.

The disk mounting mechanism 10 includes a clamper 13 for clamping the disk 3 to the turntable 8a (9a) and a clamper holding mechanism 18. The clamper 13 is constructed so as to be magnetically attracted to the turntable 8a (9a), and the clamper 13 becomes stable by being attracted to a magnet 17 of the transfer mechanism 4 when the disk mounting mechanism 10 is in upright position.

The disk mounting mechanism 10 rises and flattens in directions A and B to mount and dismount the disk 3 and the clamper 13 on and off the turntable 8a (9a).

Figure 3:
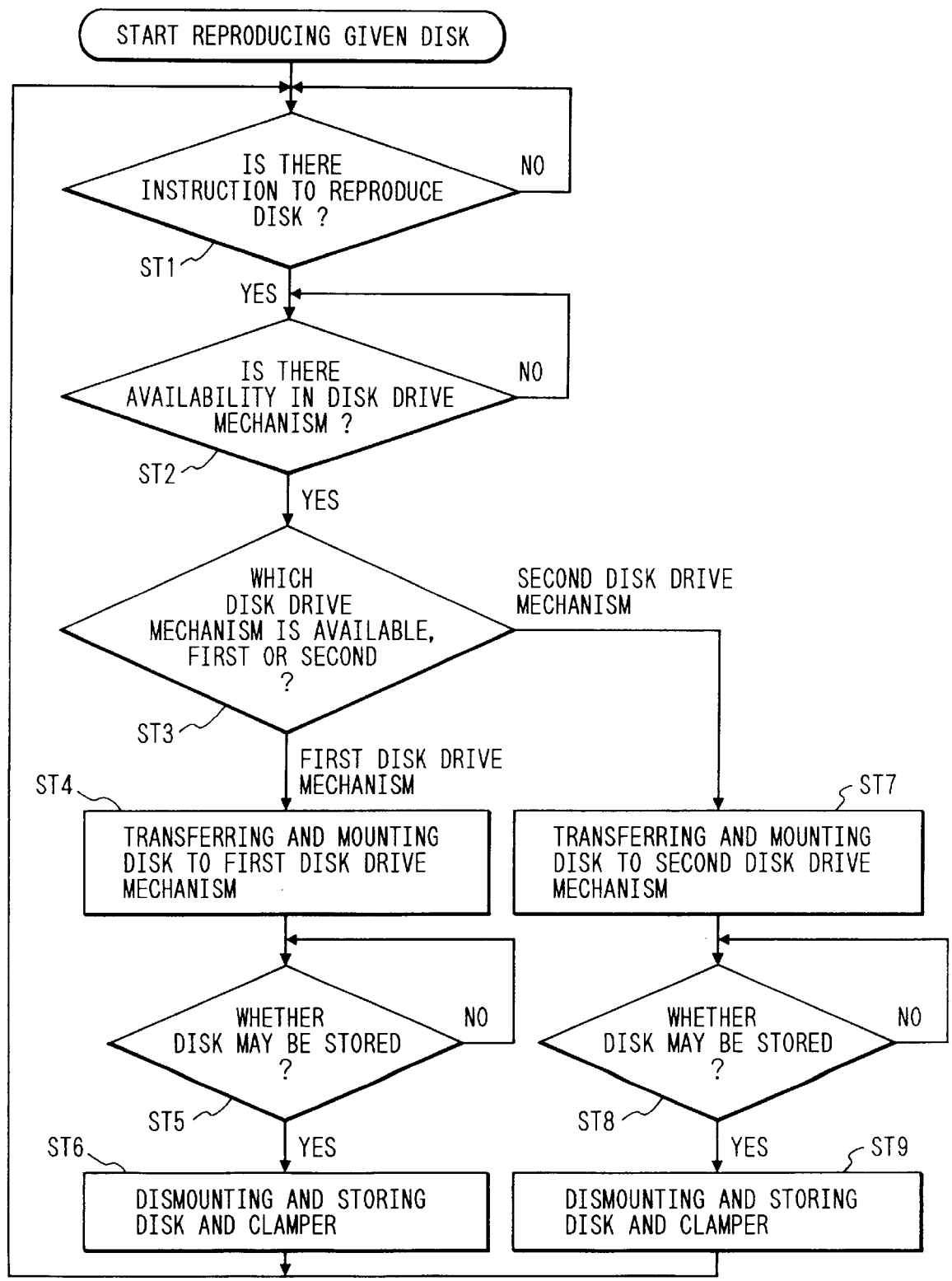
FIG. 3 is a flow-chart of disk mounting, dismounting and storage operations in a disk reproducing apparatus in accordance with the present invention.

FIG. 3 is a flow-chart of a disk reproducing operation in a disk reproducing apparatus in accordance with the present invention. When reproducing of a disk 3(n) is instructed in step ST1, the process proceeds to step ST2 and it is judged using disk sensors provided in the disk drive mechanisms 8, 9 respectively whether the disk drive mechanisms 8, 9 are available or not. If only the disk drive mechanism 8 is available, the process proceeds from step ST3 to step ST4 and the transfer mechanism 4 moves in a direction C or D (FIG. 2) on the rail 5 to retrieve the objective disk 3(n) from the disk rack 1a (1b). The disk mounting mechanism 10 in the rising state obtains an objective disk 3(n) from the disk rack 1a (1b) and holds it with the holding rollers 12a to 12d. After moving to the disk mounting operating position, the disk mounting mechanism 10 is rotated in the direction A (FIG. 2) so as to flatten to place the disk 3(n) and the clamper 13 on the turntable 8a, and the holding rollers 12a to 12d are moved outward to release the disk 3(n) and further the clamper 13 is released to mount the disk 3(n) on the turntable 8a.

After mounting the disk 3(n) and the clamper 13 on the turntable 8a, the disk mounting mechanism 10 is rotated in the direction shown by the arrow B in FIG. 2 so as to rise and is in a stand-by state for the next disk mounting operation. When the disk 3(n) is mounted, the disk drive mechanism 8 is brought to reproducing state.

When an instruction for storing disk such as stopping reproducing is received, the process proceeds from step ST5 to step ST6, and the transfer mechanism 4 is moved on the rail 5 to position the disk mounting mechanism 10 at the disk mounting operating position for the disk drive mechanism 8. The disk mounting mechanism 10 dismounts the disk 3(n) and the clamper 13 in the reverse order of mounting, and returns and stores the disk 3(n) to the disk rack 1a (1b) and stores the clamper 13 into the disk mounting mechanism 10.

Although the above description is a case where only the disk drive mechanism 8 is available, in a case where only the disk drive mechanism 9 is available the process is similar. That is, in step ST7 the disk 3(n) is transferred and mounted on the disk drive mechanism 9 to be reproduced. In step ST8 an instruction for storing disk is waited for. When an instruction for storing disk such as stopping reproducing is received, the process proceeds from step ST8 to step ST9, and the disk mounting mechanism 10 dismounts the disk 3(n) and the clamper 13 in the reverse order of mounting, and returns and stores the disk 3(n) to the disk rack 1a (1b) and stores the clamper 13 in the disk mounting mechanism 10.

In the case where both of the disk drive mechanisms 8, 9 are available, selected is the disk drive mechanism which is located at a position where the moving distance from the extracting operating position of the disk rack 1a (1b) for the objective disk 3 to the disk mounting operating position is the shortest selected.

Although a disk 3 is extracted from the disk rack 1a (1b) in order to be mounted on the available disk drive mechanism when at least one of the disk drive mechanisms 8, 9 are available, no disk 3 is retrieved and transferred when none of the disk drive mechanisms 8, 9 are available.

Figure 4:
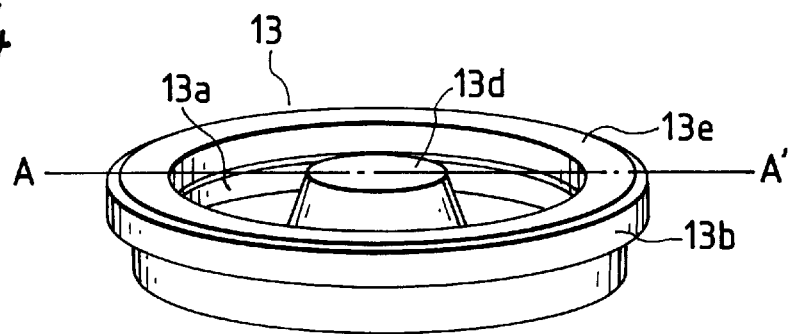
FIG. 4 is a perspective view showing an embodiment of a clamper in a disk reproducing apparatus in accordance with the present invention.
Figure 5:
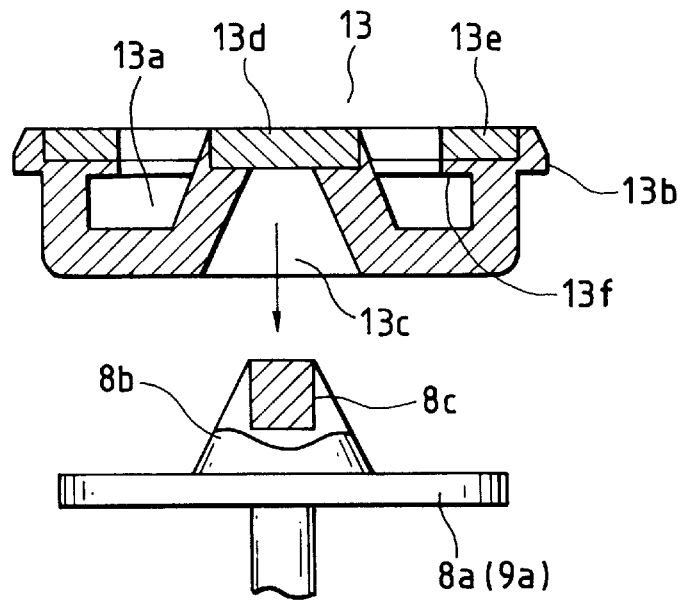
FIG. 5 is a cross-sectional side view taken along line AA' in FIG. 4 showing the relationship between a clamper and a turntable in a disk reproducing apparatus in accordance with the present invention.

The relationship between the turntable 8a (9a) and the clamper 13 in the aforementioned disk reproducing apparatus will be described, with reference to FIG. 4 and FIG. 5. A ring-shaped engaging groove 13a is formed below the top surface of the disk-shaped clamper 13, and the step portion 13f of the engaging groove 13a is used for engaging with a hook provided for holding the recovered clamper 13 inside the disk mounting mechanism 10. A projecting peripheral wall 13b formed in a ring-shape projection from the outer periphery of the clamper 13 is used as a engaging portion when the clamper 13 is pulled up to be recovered from the turntable 8a. In the bottom surface of the clamper 13, there is provided an indented truncated cone 13c which is engaged with a projecting truncated cone 8b provided in the turntable 8a. A magnetic member 13d made of iron or magnetic stainless steel is fixed to the bottom of the indented truncated cone 13c, and is magnetically adhered to a turntable magnet 8c provided in the center of the projecting truncated cone 8b of the turntable 8a when the clamper 13 is mounted on the turntable 8a (9a) in order to stably attach the clamper 13 to the turntable 8a (9a). A surface of the indented truncated cone 13c and a surface of the projecting truncated cone 8b of the turntable 8a (9a) perform a centering function when engaging with each other. Further, a ring shaped surface ring 13e provided in the outer side of the engaging groove 13a on the top surface of the clamper 13 adheres to the magnet 17 of the transfer mechanism 4 as described above so that the clamper 13 is stabilized so as to not generate noise due to vibration of the clamper 13 when the transfer mechanism 4 moves the disk mounting mechanism 10 in upright position at a high speed.

The disk 3 mounted on the turntable 8a is sandwiched between the turntable 8a and the clamper 13 by engaging the clamper 13 with the projecting portion 8b from the upside.

Figure 6:
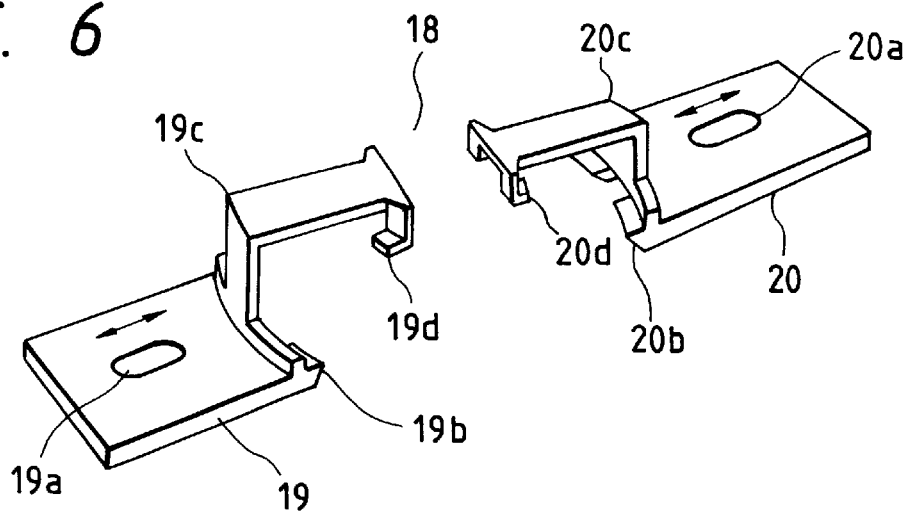
FIG. 6 is a perspective view showing a clamper holding member in a disk reproducing apparatus in accordance with the present invention.

The basic construction of the clamper holding mechanism 18 for holding the aforementioned clamper 13 will be described, referring to FIG. 6. Two clamper holding members 19, 20 in the both sides of the clamper 13 facing to each other are placed in the disk mounting mechanism 10 so that the clamper holding members may be moved back and forth though the clamper 13 with long holes 19a, 20a. The clamper holding members 19, 20 each have, in the front ends, projections 19b, 20b to engage with the projecting peripheral wall 13b of the clamper 13, and have arm portions 19c, 20c rising from the front end formed in an upside-down L-shape so as to detour the outer periphery of the clamper 13. The arm portions 19c, 20c have, in the front ends, hook portions 19d, 20d for holding the clamper 13 by engaging with the step portion of the engaging groove portion 13a of the clamper 13.

When the two clamper holding members 19, 20 are moved forward to be close to each other, the projections 19b, 20b in the front ends are engaged with the projecting peripheral portion 13b of the clamper 13 to hold the clamper 13. When the two clamper holding members 19, 20 are moved backward to be apart from each other, the projections 19b, 20b are detached from the projecting peripheral portion 13b to release the clamper 13. On the other hand, when the two clamper holding members 19, 20 are moved forward to be close to each other, the hook portions 19d, 20d are detached from the step portion of the engaging groove portion 13a of the clamper 13 to release the clamper 13. When the two clamper holding members 19, 20 are moved backward to be apart from each other, the hook portions 19d, 20d are engaged with the step portion of the engaging groove portion 13a to hold the clamper 13.

The details of the construction designed to move the clamper holding members 19, 20 forward and backward will be described later. The clamper holding members 19, 20 are applied with force by springs so that the projections 19b, 20b release the projecting peripheral portion 13b of the clamper 13 when the clamper holding members are moved backward, the clamper holding members 19, 20 are moved by cams so that the projections 19b, 20b engage with the projecting peripheral portion 13b.

Figure 7:
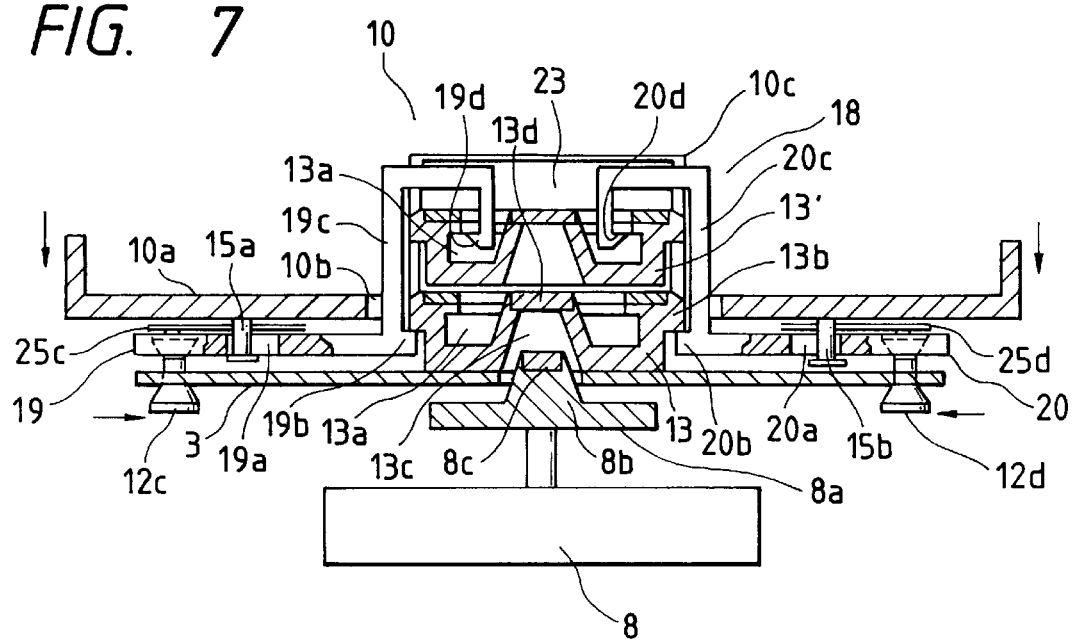
FIG. 7 is an explanatory cross-sectional side view showing the mounting process of a disk and a clamper in a disk reproducing apparatus in accordance with the present invention.
Figure 8:
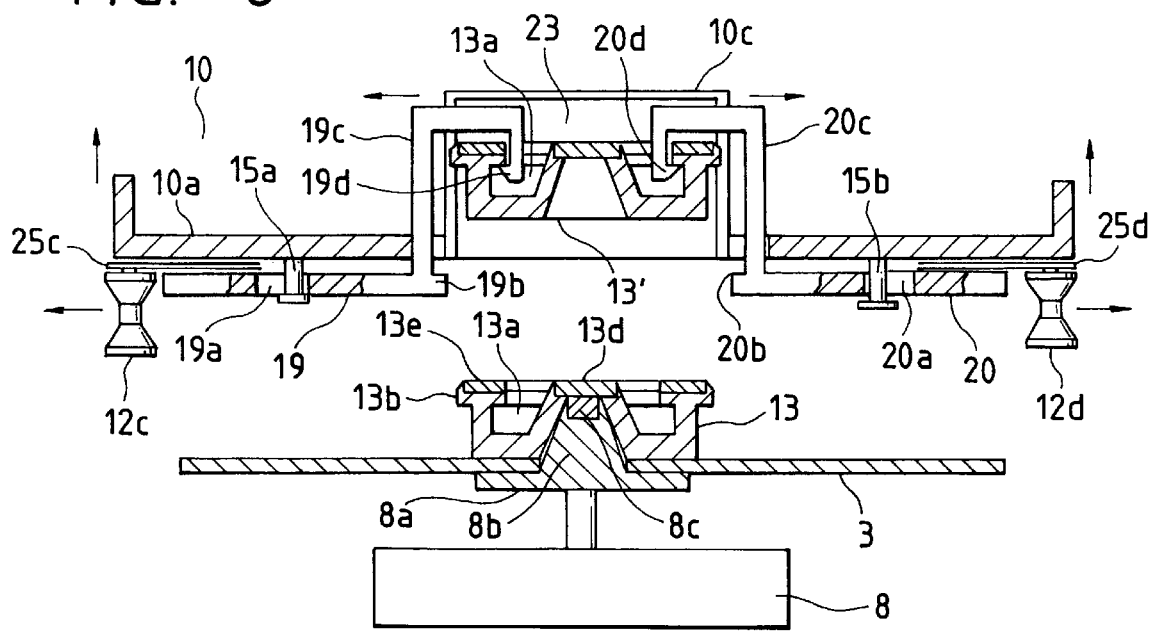
FIG. 8 is an explanatory cross-sectional side view showing a state after mounting a disk and a clamper in a disk reproducing apparatus in accordance with the present invention.

FIG. 7 and FIG. 8, illustrate the basic construction of the disk mounting mechanism 10 having the holding rollers 12a to 12d, the clamper 13 and the clamper holding members 19, 20 described above and the operation of mounting the disk 3 on the turntable 8a (9a) using the disk mounting mechanism 10.

FIG. 7 shows a state where the disk mounting mechanism 10 is flattened above the turntable 8a (9a) holding a disk 3 and two clampers 13, 13'. FIG. 8 shows a state after mounting the disk 3 and the clamper 13 on the turntable 8a and the disk mounting mechanism 10 is slightly raised.

A base plate 10a of the base body of the disk mounting mechanism 10 is attached to the transfer mechanism 4 so as to turn downward around an axis (reference character 11 in FIG. 1 and FIG. 2). The operation of turning downward is performed by a motor not shown in the figures. The holding rollers 12c, 12d (12a, 12b) are movably attached in the front surface side of the base plate 10a with roller arms 25c, 25d to hold the disk 3 by pushing the outer periphery of the disk. The clamper holding members 19, 20 are slidably attached to the front surface side of the base plate 10a with supporting pins 15a, 15b engaging with the long holes 19a, 20a described above, and the arm portions 19c, 20c are projected to the back surface side of the base plate 10a through a hole 10b formed in the base plate 10a. Each of the supporting pins 15a, 15b has a fall-off preventing head, and the supporting pin 15b is formed to project a little farther out from surface of the base plate 10 than the supporting pin 15a.

In a clamper storing space 23 formed between the arm portions 19c, 20c of the clamper holding members 19, 20, the two clampers 13, 13' are stacked and stored so that the indenting portions 13c is directed to the turntable side as shown in FIG. 7. In this state, the two clamper holding members 19, 20 are moved forward to be close to each other and the projections 19b, 20b are engaged with the projecting peripheral portion 13b of the clamper 13 in the lower side to hold the clamper 13. The clamper 13' in the upper side mounts on the clamper 13 in the lower side. The hook portions 19d, 20d are separated from the step portion 13f of the engaging groove portion 13a of the clamper 13'. The disk 3 to be reproduced is held with holding rollers 12c, 12d (12a, 12b). The disk mounting mechanism 10 is transferred to the disk mounting operating position for the disk drive mechanism 8 in order to mount the disk 3 on the turntable 8a of the disk drive mechanism 8, the disk mounting mechanism 10 is turned downward toward the disk drive mechanism 8. When the disk mounting mechanism 10 is turned down to the position of the turntable 8a, the disk 3 and the clamper 13 are centered by the projecting portion 8b of the turntable 8a to be engaged with the turntable 8a. At that time, the clamper 13 strongly holds the disk 3 to the turntable 8a by the clamping force between the magnetic member 13d and the magnet 8c provided in the indenting portion 8b. Then the interval of the holding rollers 12c, 12d (12a, 12b) is largely opened to release the disk 3 and the clamper holding members 19, 20 are moved backward to release the clamper 13. At that time, by moving the clamper holding members 19, 20 backward, the hook portions 19d, 20d are engaged with the step portion of the engaging groove portion 13a of the clamper 13' in the upper side to hold the clamper 13' so that it does not fall down.

Then the disk mounting mechanism 10 is rotated around the axis 11 to raise upward. The disk mounting operation is then complete. Mounting a disk to the other disk drive mechanism 9 is performed in the same manner as the above.

When the disk mounting mechanism 10 is raised upright, the clamper 13' held by the clamper holding members 10, 20 is contacted to the magnet 17 provided in the transfer mechanism 4 to be attracted to the magnet 17. In this state, the clamper holding members 19, 20 are moved forward decreasing the interval to release the clamper 13', and the disk mounting mechanism 10 is brought to the stand-by state to clamp the next disk.

The two clampers 13, 13' are stored in the clamper storing space 23, and the clamper 13, 13' stored last is extracted first at the next disk mounting to clamp the disk 3. The two clamper 13, 13' are of the same shape and either can be engaged with each of the turntable 8a, 9a to hold the disk 3. Therefore, there is no need to prepare a dedicated clamping device for each of the disk drive mechanisms, and accordingly the disk 3 can be certainly held with a simple construction.

Figure 9:
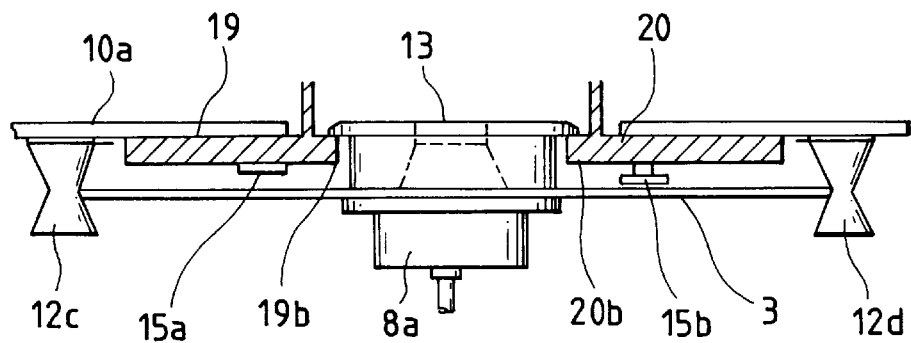
FIG. 9 is an explanatory cross-sectional side view showing a disk and clamper recovery process in a disk reproducing apparatus in accordance with the present invention.

The disk 3 and the clamper 13 mounted on the turntable in the above manner are returned to the proper positions after reproducing is completed as follows. FIG. 9 shows a state where the disk mounting mechanism 10 is moved and turned downward to the upper side of the turntable 8a in order to recover the disk 3 and a clamper 13.

The disk mounting mechanism 10 is turned downward to the turntable 8a and the holding rollers 12c, 12d (12a, 12b) are moved so that the interval between the holding rollers 12c, 12d (12a, 12b) becomes a little larger than the diameter of the disk 3. The clamper holding members 19, 20 are moved backward so that the interval between the projections 19a, 20a becomes a little larger than the outer diameter of the projecting peripheral portion 13d of the clamper 13. After the disk 3 is guided between the holding rollers 12c, 12d (12a, 12b), the holding rollers 12c, 12d (12a, 12b) are moved so as to decrease the interval between them to hold the disk 3 between the holding rollers 12c, 12d (12a, 12b).

The clamper holding members 19, 20 are moved to decrease the interval so that the projections 19a, 20a are inserted in the lower side of the projecting peripheral portion 13b of the clamper 13. The clamper holding members 19, 20 are arranged nearly symmetrically in regard to the clamper 13 so that the force to pull up the clamper 13 is applied to the right hand side and the left hand side of the clamper 13 is balanced and the clamper 13 is held without being fallen.

As the disk mounting mechanism 10 is turned upright in this state, the projections 19b, 20b of the clamper holding members 10, 20 are caught at the lower side of the projecting peripheral portion 13b of the clamper 13.

Figure 10:
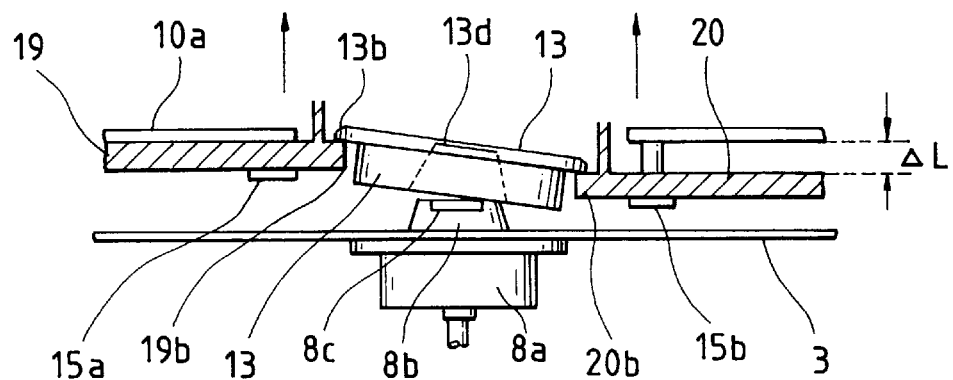
FIG. 10 is an explanatory view showing a disk and clamper recovery process in a disk reproducing apparatus in accordance with the present invention.
Figure 11:
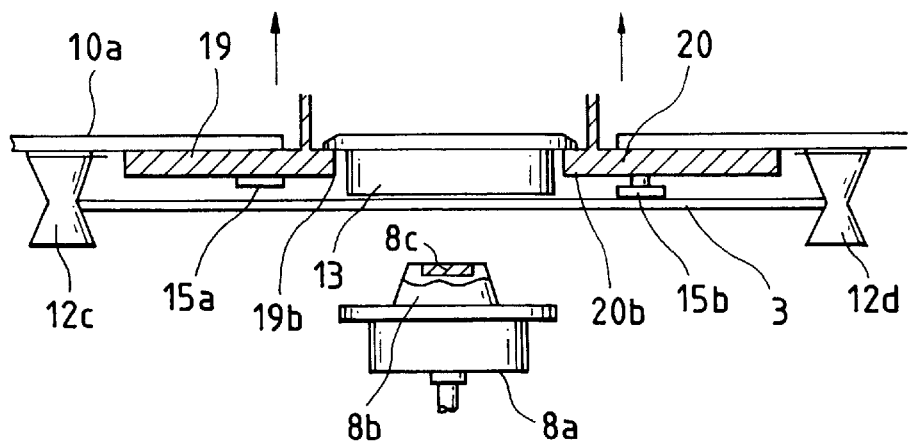
FIG. 11 is an explanatory cross-sectional side view showing a disk and clamper recovery process in a disk reproducing apparatus in accordance with the present invention.
Figure 13:
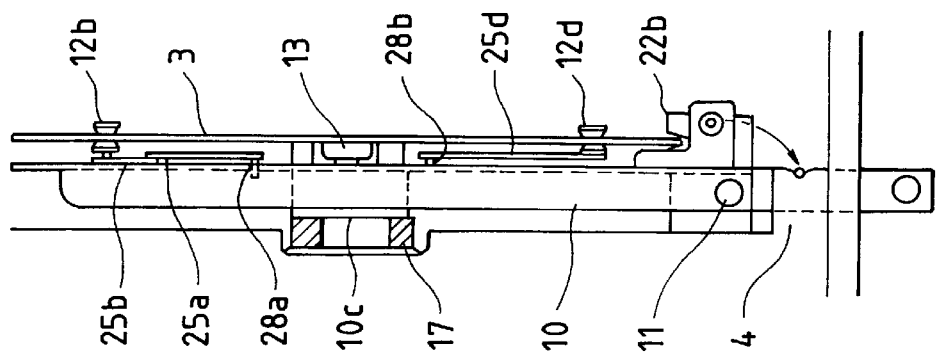
FIG. 13 is a side view showing the disk mounting mechanism of FIG. 12.
Figure 12:
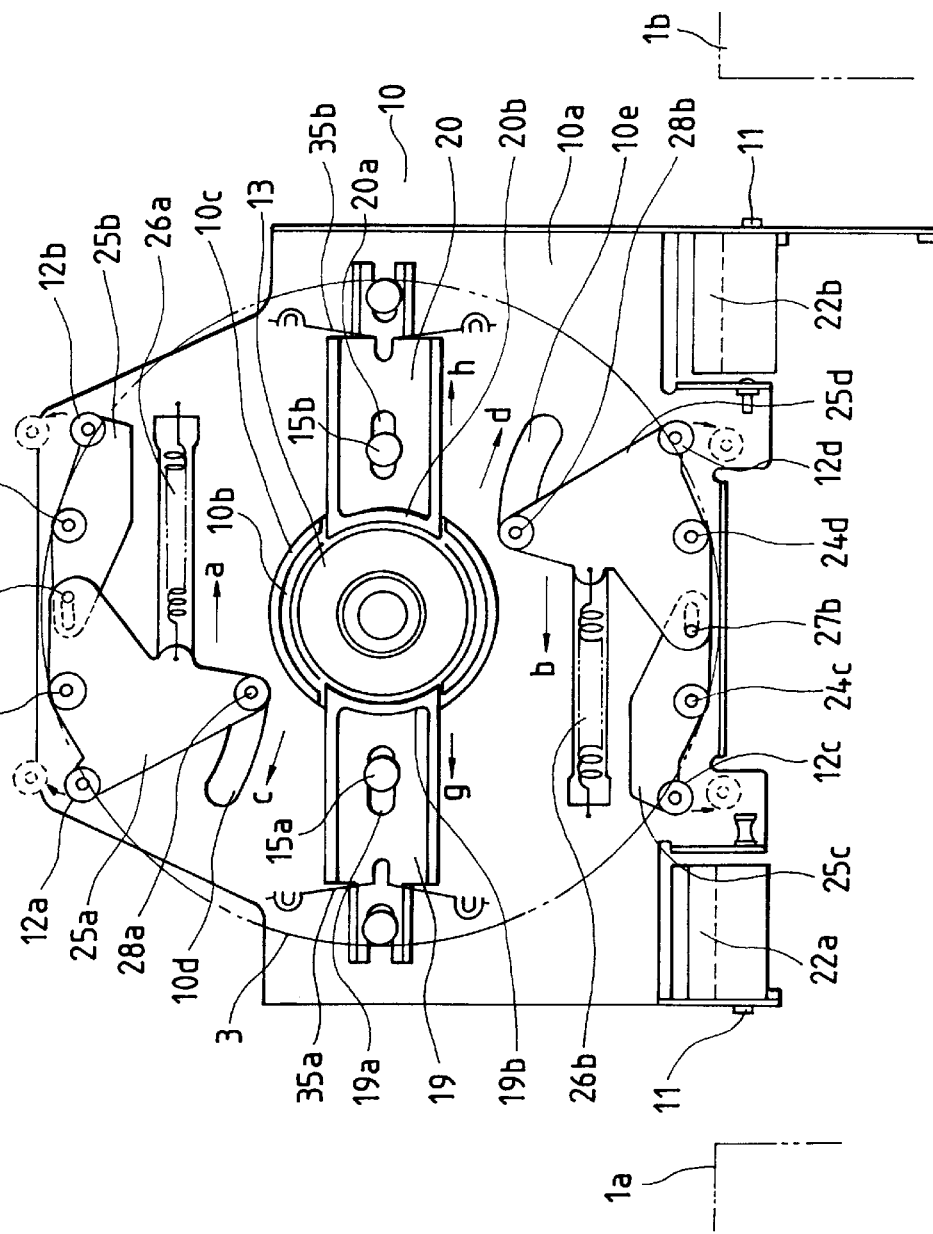
FIG. 12 is a front view showing a disk mounting mechanism in a disk reproducing apparatus in accordance with the present invention.
Figure 14:
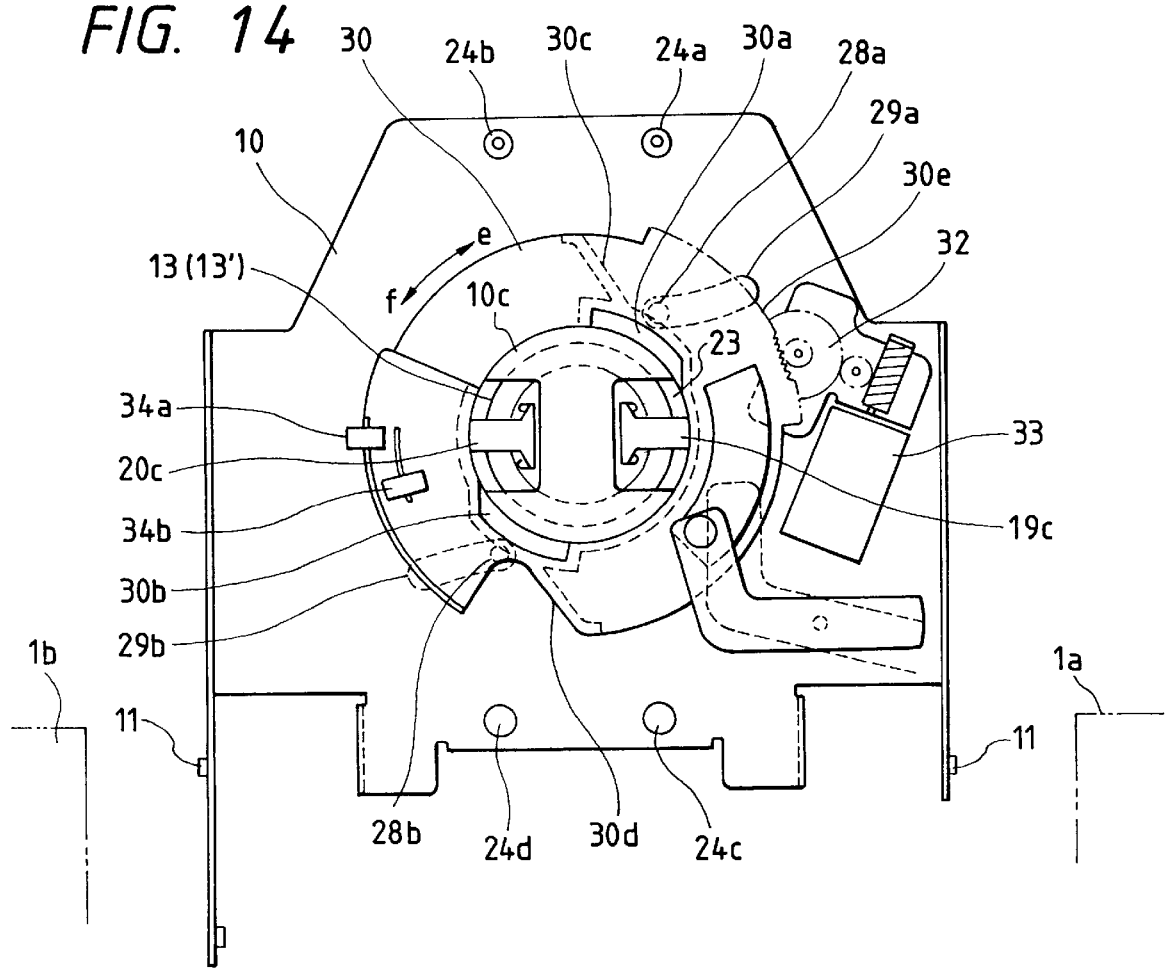
FIG. 14 is a rear view showing the disk mounting mechanism of FIG. 12.
Figure 15:
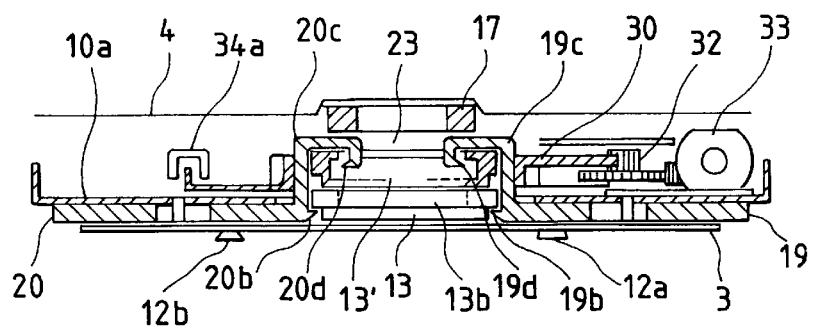
FIG. 15 is a cross-sectional side view showing the disk mounting mechanism of FIG. 12.

When the disk mounting mechanism 10 is further turned up, the projections 19a, 20a of the clamper 19, 20 push up the lower side of the projecting peripheral portion 13b of the clamper 13 to detach the clamper 13 from the turntable 8a. However, a large force is required to detach the clamper 13 from the turntable 8 since the magnetic member 13d is attracted to the magnet 8c of the turntable 8. The reaction force to detach the clamper 13 from the turntable 8a acts on the clamper holding members 19, 20. Since the clamper holding member 20 is attached to the base plate 10a with a supporting pin 15b having a length longer than the supporting pin 15a attaching the clamper holding member 19 by ΔL, the reaction force to detach the clamper 13 in the clamper holding member 20 is delayed compared to the clamper holding member 19. Therefore, the side of clamper 13 on the side of the clamper holding member 19 is detached from the turntable 8a, before the side of the clamper 13 on the side of the clamper holding member 20 is detached; that is, the clamper is incliningly lifted up as shown in FIG. 10. The force required for detaching the clamper 13 (which is magnetically attracted to the turntable 8a) on one side by first tilting the clamper is extremely small compared to the force required for detaching the clamper 13 directly in a horizontal state. Therefore, by doing so, it is possible to decrease the required strength of the members composing the clamper holding mechanism 18 and the force for driving the clamper holding mechanism. Then the disk 3 is lifted up held with the holding rollers 12c, 12d (12a, 12b) at the same time that the disk mounting mechanism 10 is turned upright as shown in FIG. 11.

Although the supporting pin 15b that attaches the clamper holding member 20 to the base plate 10a is a little longer than the supporting pin 15a, the total length of the supporting pin 15b is limited so that the pin does not contact the disk 3 when the disk mounting mechanism 10 is turned downward. Although the difference (ΔL) between the supporting pins is set to 1 mm, the difference may be more than 1 mm when the clamping force of the clamper 13 to the turntable 8a is large.

By employing a construction where the clamper holding member 20 is pushed toward the side of the base plate 10a using a spring, the clamper holding member 20 is moved toward a lower position than the level of the clamper holding member 19 by expanding the spring due to the lifting force only when the clamper 13 is lifted. Therefore, the clamper 13 can be tilted.

The details of the construction of the disk mounting mechanism 10 performing as above will be described below, referring to FIG. 12 to FIG. 15. Wherein like parts in each of the figures are identified by the same reference characters, and repeated explanations will be omitted.

The disk mounting mechanism 10 comprises disk guides 22a, 22b for guiding the disk 3 extracted by the disk lever 7 (FIG. 1) from the disk racks 1a, 1b on both sides to the disk holding space formed between the holding rollers 12a to 12d and also for guiding the disk 3 pushed out from the holding rollers 12a to 12d to disk racks 1a, 1b.

The disk mounting mechanism 10 has a clamper storing member 10c, in the center, rising from the edge of the hole 10b of the base plate 10a to the back surface side so as to surround a part of the aforementioned clamper storing space 23 for storing the clamper 13 (13'). The outer peripheral surface of the clamper storing member 10c is used as an engaging shaft of a ring-shaped cam 30. The inside peripheral surface of the ring-shaped cam 30 is engaged with the outer peripheral surface of the clamper storing member 10c and contacts to the outer side surface of the arm portions 19c, 20c of the clamper holding members 19, 20. Indenting portions 30a, 30b formed in a part of the inside peripheral surface allows the clamper holding members 19, 20 to move backward by being pushed with springs 35a, 35b. Therefore, by rotating the ring-shaped cam 30 the two clamper holding members 19, 20 are moved backward, and consequently the projections 19a, 20a and the hook portions 19d, 20d are moved to hold or to release the clampers 13, 13'.

The four holding rollers 12a to 12d are supported with shafts in the outer end portions of roller arms 25a to 25d and rotatably supported with supporting shafts 24a to 24d extending from the base plate 10a. The inner end portions of the roller arms 25a, 25b are linked by a connecting pin 27a and a long hole, and the inner end portions of the roller arms 25c, 25d are linked by a connecting pin 27b and a long hole. The roller arms 25a, 25d are rotated counterclockwise to change their angles by being pulled in directions a and b by springs 26a, 26b, and the roller arms 25b, 25c linked with the roller arms 25a, 25d are rotated clockwise to change their angles. The directions of changing angles decrease the interval among the holding rollers 12a to 12d to hold the outer periphery of the disk 3.

Operating pins 28a, 28b standing from the roller arms 25a, 25d are projected to the base side surface of the base plate 10a through the long holes 10d, 10e formed in the base plate 10a and contact the outer peripheral surface of the ring-shaped cam 30. In the ring-shaped cam 30, there are formed inclined surfaces 30c, 30d for contacting the operating pins 28a, 28b. The inclined surfaces 30c, 30d push the operating pins 28a, 28b to the outside direction (directions shown by the arrows c, d) by rotation of the ring-shaped cam 30 to change the angle of the roller arms 25a, 25d clockwise and to change the angle of the roller arms 25b, 25c counterclockwise. Thereby, the interval of the holding rollers 12a to 12d is increased.

A rack 30e for rotating the ring-shaped cam 30 is formed in a part of the outer peripheral surface of the ring-shaped cam 30. The rack 30e is engaged with a gear 32 rotated by a driving motor 33. The driving motor 33 is of a reversely rotatable type, and rotates the ring-shaped cam 30 while monitoring the rotating position information of the ring-shaped cam 30.

Angle sensors 34a, 34b generate the rotating position information of the cam 30.

Next the operation of extracting the disk 3 from the disk rack 1a or 1b and mounting it on the turntable 8a, and the operation of returning the disk 3 mounted on the turntable 8a to the disk rack 1a or 1b will be described. This operation is performed by a control program set in a control unit.

The transfer mechanism 4 is pulled along the rail 5 by the driving wire 6 to a given disk extracting operating position in a state where the disk mounting mechanism 10 is upright. In that time, the ring-shaped cam 30 moves the clamper holding member 19, 20 forward so that the projections 19b, 20b in the front ends of the clamper holding member 19, 20 are engaged with the projecting peripheral portion 13b of the clamper 13 to hold the clamper 13 and the roller arms 25a to 25d are rotated to change their angles so that the interval of the holding arms 12a to 12d becomes larger than the diameter of the disk 3. At a given extracting operating position, the ring-shaped cam 30 rotates the roller arms 25a to 25d to change their angles so that the interval of the holding arms 12a to 12d is decreased to a position to hold the outer periphery of the disk 3.

When the disk mounting mechanism 10 holds the disk 3 in this manner, the transfer mechanism 4 transfers the disk mounting mechanism 10 to the disk mounting operating position of the disk drive mechanism 8 (turntable 8a). At this position, the disk mounting mechanism 10 is rotated to a nearly horizontal state to bring the center hole of the disk 3 to a position facing to the projecting truncated cone 8b of the turntable 8a. The inclining surface of the projecting truncated cone 8b of the turntable 8a makes a small displacement of the transfer mechanism 4 allowable.

In this state, the ring-shaped cam 30 is rotated in the direction shown by the arrow e. With this rotation, the inclining surfaces 30c, 30d of the ring-shaped cam 30 push the operating pins 28a, 28b provided in the roller arms 25a, 25d outward to change the angles of the roller arms 25a to 25d until the holding rollers 12a to 12d release the disk 3 and the disk 3 is mounted on the turntable 8a.

When the ring-shaped cam 30 is further rotated and the indenting portions 30a, 30b of the inner peripheral portion arrive at the positions of the arms 19c, 20c of the clamper holding members 19, 20, the clamper holding members 19, 20 are moved backward in directions g and h by the force of the springs 35a, 35b to release the projections 19b, 20b from the projecting peripheral portion 13b of the clamper 13, and to release the clamper 13 on the turntable 8a.

The clamper 13 is guided and centered with the inclining surface of the projecting portion 8b of the turntable 8a and magnetically attracted to the turntable 8a to hold the disk 3.

The operation of recovering a disk 3 from the turntable 8a of the disk drive mechanism 8 will be described below.

In the disk mounting mechanism 10, the ring-shaped cam 30 moves to rotate the roller arms 25a to 25d to change their angles so that the interval of the holding arms 12a to 12d are positioned outside the outer diameter of the disk 3 and the clamper holding members 19, 20 are moved backward so that the interval of the projections 19b, 20b becomes larger than the outer diameter of the projecting peripheral portion 13b of the clamper 13. The transfer mechanism 4 transfers the disk mounting mechanism 10 to the disk mounting operating position for the disk drive mechanism 8 and turns the disk mounting mechanism 10 to a nearly horizontal state. With turning of the disk mounting mechanism, the holding rollers 12a to 12d are moved to the outer peripheral position of the disk 3 mounted on the turntable 8a. The clamper holding members 19, 20 place the clamper 13 inside the clamper storing space 23 and the projections 19b, 20b are moved to the lower side position of the projecting peripheral portion 13b of the clamper 13.

Although the transfer mechanism 4 sliding on the rail 5 is displaced due to the backlash of engagement between the rail 5 and the transfer mechanism 4, the problem of interference (collision) due to the displacement can be solved by estimating the displacement in advance and moving the holding rollers 12a to 12d and the clamper holding members 19, 20 to a position outside the outer diameter of the disk including the displacement.

In this state, by rotating the ring-shaped cam 30 in the direction shown by the arrow f, the clamper holding members 19, 20 are moved forward by pushing out the arm portions 19c, 20c of the clamper holding members 19, 20 from the indenting portions 30a, 30b, and inserting the projections 19b, 20b into the lower side of the projecting peripheral wall 13b of the clamper 13. Then the inclining surfaces 30c, 30d allow the operating pins 28a, 28b to move toward the inner periphery of the ring-shaped cam 30 along the inclining surfaces 30c, 30d with the elastic force of the springs 26a, 26b, and the roller arms 25a to 25d are rotated so that the interval among the holding rollers 12a to 12d is decreased to hold the outer periphery of the disk 3. When the outer periphery of the disk 3 touches the cone surfaces of the holding rollers 12a to 12d, the disk 3 is guided to the central portion by sliding the cone surfaces of the holding rollers 12a to 12d and the disk 3 is held at a proper central position of the disk mounting mechanism 10.

As the disk mounting mechanism 10 is raised from this state, the projecting peripheral wall 13b of the clamper 13 is engaged with the projections 19b, 20b of the clamper holding members 19, 20, and the clamper 13 is tilted and lifted to be stored in the clamper storing space 23. The disk 3 is lifted by being held with the holding rollers 12a to 12d. When the disk mounting mechanism 10 is raised to an upright position, the clamper 13 is attracted to the magnet 17 of the transfer mechanism 4 and becomes stable.

The transfer mechanism 4 is stopped at a disk extracting operating position facing the disk storing groove portion to return the disk 3 held by the disk mounting mechanism 10.

Returning the disk 3 to the disk rack 1b (1a) is performed by pushing the disk 3 from opposite side of the disk rack 1b (1a) to be stored the disk 3 by a pushing roller (not shown) provided in the disk transfer means. The disk 3 is returned to a given disk storing groove portion of the disk rack 1b (1a). The disk 3 is pushed into the disk rack while the gap between the holding rollers 12a , 12c (12b, 12d) is wider.

Since relative operation of the two sets, upper and lower, of the holding rollers 12a to 12d is performed by the springs 26a, 26b as in the embodiment, operating mistakes can be prevented even if the positional error in the stopping position is large in mounting a disk 3 on the turntable 8a, 9a, in recovering the disk from the turntable or in performing the auto-change operation.

Since the two sets, upper and lower, of holding rollers 12a to 12d are symmetrically operated in regard to the center of the disk holding space by the roller arms 25a to 25d supported by the supporting shafts 24a to 24d, the disk 3 can be held in the given center position without displacement in the lateral direction.

Further, since the operations of holding and releasing the disk 3 and the mounting and recovering of the clamper 13, 13' can be linked, it is possible to construct an operating mechanism having a high reliability.

Furthermore, since mounting and dismounting of the disk 3 and mounting and dismounting of the clamper 13, 13' can be performed with a single motor when the disk mounting mechanism 10 is controlled in combination with the complex control operations of the disk change apparatus, the control program becomes simple.

Still further, since the plural holding rollers 12a to 12d provided in the disk mounting mechanism 10 hold the disk 3 by being pushed with spring force from the outer periphery toward the center, there is an advantage in that centering can be automatically performed, and transferring the disk 3 to the disk mounting mechanism 10 can be performed by a simple apparatus.

Further, since the disk mounting mechanism 10 is constructed to hold the objective disk 3 and the clampers 13, 13' concentrically, it is possible to certainly perform mounting the disk 3 and clamper 13, 13' on the turntable 8a, 9a and removing them from the turntable 8a, 9a.

Further, since the disk mounting mechanism 10 is constructed to hold the objective disk 3 and the clampers 13, 13' concentrically, it is possible to easily correspond to a plurality of disk drive mechanisms 8, 9.

Further, since the holding rollers 12a to 12d holding the disk 3 contact the outer periphery of the disk 3 due to elastic force of the springs 26a, 26b, the disk 3 can be mounted and dismounted on and off the given turntable softly.

What is claimed is:

1. An automatic changer comprising:
    at least one disk rack for retrievably arranging and storing a plurality of disks;
    a plurality of disk drive mechanisms for reproducing information recorded on said disks, each of said disk drive mechanisms having a turntable;
    one disk mounting mechanism for mounting and dismounting a disk on and off said turntable of one of said disk drive mechanisms; and
    a transfer mechanism for transferring said one disk mounting mechanism to one disk retrieving operating position of one of said at least one disk rack and to a disk mounting operating position of said turntable of one of said disk drive mechanisms;
    a plurality of clampers for clamping said disks, said clampers being normally held to said one disk mounting mechanism, and one of said clampers detached from said one disk mounting mechanism and mounted on said turntable of one of said disk drive mechanisms, together with said disk, when said disk is mounted on said turntable of one of said disk drive mechanisms.

2. The automatic changer according to claim 1, wherein said at least one disk rack further comprises a plurality of disk racks, said disk racks being arranged in parallel on both sides of a row of said plurality of disk drive mechanisms.

3. The automatic changer according to claim 1, wherein said one transfer mechanism is supported so that said one disk mounting mechanism may be transferred above said disk drive mechanisms.

4. The automatic changer according to claim 1, wherein said one disk mounting mechanism comprises a disk holding device for elastically holding an outer circumference of said disk from an outside edge of the disk for mounting and for dismounting the disk on and off said turntable of one of said plurality of disk drive mechanisms.

5. The automatic changer according to claim 4, wherein said disk holding device comprises a disk holding member for holding said disk by elastically contacting said disk in at least three positions of said outer circumference and a holding member opening device for opening a gap between the disk holding members that exceeds a diameter of the disk.

6. The automatic changer according to claim 4, wherein said disk holding device comprises:

a disk mounting surface;

a plurality of roller arms swingably connected to said disk mounting surface along a disk holding space which is parallel to said disk mounting surface for positioning a disk;

a holding roller provided perpendicularly to said disk mounting surface and connected to each of said roller arms in order to connect the outer circumference of said disk positioned in said disk holding space;

a plurality of springs for biasing each of said roller arms so that the holding rollers are urged toward a center of said disk holding space so as to elastically contact the outer circumference of the disk; and a releasing device for biasing said roller arms in opposition to said plurality of springs so that said holding rollers move toward an outer direction of said disk holding space and detaches from the outer circumference of the disk.

7. The automatic changer according to claim 6, wherein said transfer mechanism further comprises:

a disk extracting device for pushing and extracting the disk from said disk rack, and said disk holding device holds the disk, which is extracted by said said disk extracting device, with said holding rollers.

8. The automatic changer according to claim 6, wherein said holding rollers are substantially cylindrical in cross-section having a smaller diameter in its middle longitudinal portion and a larger diameter at both longitudinal end portions, the disk being held with the smaller diameter portion.

9. An automatic changer comprising:

at least one disk rack for retrievably arranging and storing a plurality of disks;

a plurality of disk drive mechanisms for reproducing information recorded on said disks, each of said disk drive mechanisms having a turntable;

one disk mounting mechanism for mounting and dismounting a disk on and off said turntable of one of said disk drive mechanisms; and a transfer mechanism for transferring said one disk mounting mechanism to one disk retrieving operating position of one of said at least one disk rack and to a disk mounting operating position of said turntable of one of said disk drive mechanisms; and a plurality of clampers for clamping said disks, said clampers being normally held to said disk mounting mechanism, and detached from said one disk mounting mechanism and one of said clampers being mounted on said turntable of one of said disk drive mechanisms, together with said disk, when said disk is mounted on said turntable of one of said disk drive mechanisms; wherein said one disk mounting mechanism comprises a disk holding unit for holding one of said disks to mount and dismount said one of said disks on and off said turntable of one of said disk drive mechanisms, and a clamper mounting unit for supplying and setting one of said clampers on said turntable which the disk is mounted on and removing and holding said one of said clampers from said turntable which the disk is mounted on.

10. The automatic changer according to claim 9, wherein said disk mounting mechanism comprises a storing unit for storing a plurality of clampers in a stack, and a selecting unit for supplying said clampers in a last in first out order.

11. The automatic changer according to claim 10, wherein said storing unit stores the clampers in a concentric state with respect to said disk held by said one disk mounting mechanism.

12. An automatic changer comprising:

at least one disk rack for retrievably arranging and storing a plurality of disks;

a plurality of disk drive mechanisms for reproducing information recorded on said disks, each of said disk drive mechanisms having a turntable;

one disk mounting mechanism for mounting and dismounting a disk on and off said turntable of one of said disk drive mechanisms; and a transfer mechanism for transferring said one disk mounting mechanism to one disk retrieving operating position of one of said at least one disk rack and to a disk mounting operating position of said turntable of one of said disk drive mechanisms; and a plurality of clampers for clamping said disks, said clampers being normally held to said disk mounting mechanism, and detached from said one disk mounting mechanism and one of said clampers being mounted on said turntable of one of said disk drive mechanisms, together with said disk, when said disk is mounted on said turntable of one of said disk drive mechanisms; wherein said plurality of disk drive mechanisms are installed along a retrieving side of said at least one disk rack and respectively have turntables mounting disks in horizontal states relative to said disk racks;

said disk mounting mechanism comprising a disk holding unit being rotatably installed in said transfer mechanism so as to rise and flatten relative to said turntable, and for holding a disk extracted from said disk rack in said rising state, and for mounting and dismounting the disk on and off said turntable in said flattened state; and a clamper mounting unit for supplying and removing a said one of said clampers to be mounted and dismounted on and off the turntable when mounting the disk, said clamper mounting unit being installed in said disk holding unit.

13. The automatic changer according to claim 12, wherein said clamper mounting unit comprises a clamper holder for supplying said one of said clampers on the turntable by releasing said one of said clambers on the turntable during mounting of said disk and removing said one of said clampers by engaging with projecting edges formed in an outer periphery of said one of said clampers to lift up said disk from the turntable.

14. The automatic changer according to claim 13, wherein said turntable comprises:

a projecting truncated cone for engaging with and centering the disk; and a magnetic member;

and wherein said clamper further comprises an indented truncated cone for concentrically engaging with said projecting truncated cone, and a clamper magnetic member for generating a magnetically attracting force between said magnetic member and said clamper magnetic member.

15. The automatic changer according to claim 12, wherein said transfer mechanism further comprises a magnetically attracting unit for magnetically attracting and holding a magnetic member of the clamper stored in said clamper mounting unit when said disk mounting mechanism is in a rising state.

16. An automatic changer comprising:

at least one disk drive mechanism for reproducing information recorded in a disk mounted on a turntable;

one disk mounting mechanism for mounting and dismounting a disk on and off said turntable;

one clamper mounting unit for storing a plurality of clampers and mounting and dismounting one of said clampers which is detached from said one disk mounting mechanism and magnetically attracted to said turntable to hold a disk mounted on said turntable by putting the disk between said turntable and said one of said clampers in order to be magnetically attracted to said turntable, wherein said one clamper mounting unit detaches said one of said clampers from said turntable by pulling up one end of a peripheral portion of said one of said clampers and then pulling up the other end.

17. The automatic changer according to claim 16, wherein said clamper mounting unit comprises a clamper holder for supplying and magnetically attracting said one of said clampers on the turntable by releasing said one of said clampers onto the turntable during mounting said disk, and removing said one of said clampers from said turntable by engaging with one end of the projecting edges formed in an outer periphery of said one of said clampers to lift up said one end and then pulling up the other end.

* * * * *